Reissued Sept. 29, 1931 Re. 18,214

UNITED STATES PATENT OFFICE

ABRAHAM SIDNEY BEHRMAN, OF CHICAGO, ILLINOIS

SEPARATOR PLATE

No Drawing. Original No. 1,784,981, dated December 16, 1930, Serial No. 339,269, filed February 11, 1929. Application for reissue filed June 6, 1931. Serial No. 542,687.

My invention has to do with separators for use in electric storage batteries and electrolytic cells of various sorts.

One object of my invention, generally stated, is to provide an improved separator which is highly permeable, creates but little internal resistance, is absolutely inert, will not permit passage of the active material, will last indefinitely, and possesses sufficient resiliency and elasticity to compensate for the changes occurring in an electrolytic cell.

Another object of my invention is to provide a separator having a surface which will yieldingly conform to the surfaces of the battery electrodes between which it is placed and will hold in place any loosened active material. A certain amount of active material sheds from the positive electrode during each cycle of charge and discharge and this loss is replaced by the conversion of additional electrode material to the active form. Ultimately there is insufficient material left to provide the necessary capacity and the plate is worn out. If this loosened active material can be held in contact with the electrode it continues to function normally and greatly increases the useful electrode life.

The separators heretofore most commonly used have been made of wood, or wood in combination with other materials, as for example, rubber, felted glass wool, etc. Wood separators have several serious disadvantages. When cut into sheets sufficiently thin to offer minimum resistance, wood is extremely fragile and possesses relatively low mechanical strength.

Another objection to the use of wood separators is that, under normal operating conditions in a battery, certain substances are extracted from the wood which have a most deleterious effect on the performance and life of the battery (cf. Vinal and Schramm, Journal Amer. Inst. of Elec. Eng., p. 128, Feb. 1925). Probably the greatest single objection to wood separators, however, is their necessarily short life. Wood, being essentially cellulose, is gradually dehydrated by the sulphuric acid electrolyte. As a result, the separator shrinks and splits, permitting passage of the active material and consequently short-circuiting. Furthermore, the dehydrated and charred wood, being largely carbon, is itself conducting and so further increases the losses of internal energy.

The average life of a wood separator plate in service is from one to two years. When broken down it must be replaced. The most common cause for rebuilding batteries is the necessity for replacing the wood separators. Without the requirement for this expensive replacement, a battery under ordinary conditions could remain in continuous service for a period much longer than the life of the wood separator components.

Separators made of materials other than wood have been proposed and experimented with in the past, but they have either possessed one or more of the above described objectionable features or have been too expensive to be used commercially.

I have discovered that a separator having the desirable characteristics outlined above, and free from the objections inherent in wood separators, may be produced by using, as the body of such separator, particles of silica gel from which the water has been largely or entirely removed, the dehydration being carried to such a point that the dried material has assumed substantially its ultimate physical structure, possesses a vitreous luster, has great mechanical strength, and will not revert to a mushy or gelatinous form when treated with water or other liquid.

I am aware that others have contemplated the employment of silica gel in connection with the production of separators, but not in the form and manner in which I make use of the same. The permeability of silica gel to electrolytic ions is well known, but those to whom I have referred as having contemplated its employment in separators have proposed to make use of it, not in its hard rigid and non-revertible form as the principal material of the body of the separator supplying the necessary rigidity thereto, but in its soft and moist gelatinous form as filler material extending across and obstructing relatively large openings in a porous diaphragm made of a different more rigid material.

In this specification and in the appended claims, by "silica gel" I mean the hard, rigid, substantially dry material, definitely dehydrated beyond the point where it will become gelatinous or mushy with water or other liquid.

In following out my invention, I take hard, rigid silica gel particles, mix them with sufficient rubber cement or other inert binding material to form a workable plastic mass, press or mold the mixture into the particular separator shape desired, and dry the resulting separator to remove the solvent.

The following example is presented herein merely for the purpose of exemplification. It will be appreciated that both the formula and the procedure set forth in such example are susceptible of modification without constituting a departure from the invention as defined in the appended claims.

The silica gel may be prepared by any suitable method, as for example by the method disclosed in my copending application Serial No. 46,890, filed July 29, 1925, (now Patent No. 1,755,496, granted April 22, 1930), or by the method disclosed in Patrick Patent No. 1,297,724, or by the method involving the acid treatment of silicates disclosed in my copending application Serial No. 46,889 filed July 29, 1925. The hard form of silica gel produced by the process disclosed in my copending application, and when dried to constant weight at about 50° C., usually contains about 12½% of water and has an apparent density of about 30 lbs. per cubic foot. This dry material will absorb 90 to 100 per cent of its own weight of water. In spite of this tremendous porosity, the particles of dry material are glassy and almost perfectly transparent. Examination with a powerful microscope fails to reveal any porous structure, so that the pores are evidently submicroscopic, as is characteristic of such materials.

The rubber cement may be any one of the common rubber cements now on the market, such as Goodrich No. 4, which is essentially a solution of rubber in benzol and containing about 7% by weight of rubber.

I take about 1000 grams of the silica gel, preferably between 40 and 100 mesh screen size, and mix it with about 1360 grams of the rubber cement in any convenient way, as for example by the employment of a kneading machine.

The size of silica gel particles employed may be made to vary widely, and will depend largely on the particular requirements in each case. For example, in certain cases where maximum elasticity is not essential, I use silica gel particles ranging in size chiefly from 10 to 20 mesh. In this case, I prefer to use considerably less rubber cement than in the previous example, and to harden the rubber slightly by means of sulphur chloride or some other vulcanizing agent. Obviously, the greater the proportion of silica gel in the separator plate, and the less the proportion of binder, the greater will be the porosity of the plate, and the more direct and less circuitous will be the path of the ions of the electrolyte.

The mixing operation is preferably performed in a closed container in order to avoid premature evaporation of the solvent. After uniform mixing has been obtained, the resulting plastic mass is pressed, extruded, molded or otherwise formed into the desired shape. This may be a flat, ribbed or grooved plate, or any other form well known in the art.

The plate is then allowed to dry. The drying operation may take place at room temperature, but is preferably carried on at a temperature somewhat higher than room temperature in order to expedite evaporation of the solvent. If desired, the solvent may be recovered by any of the processes well known to chemical engineering practice.

A separator plate constructed in accordance with my invention is light in weight, highly permeable, resilient and yielding, and has ample mechanical strength for the purpose for which intended. If greater rigidity is desired, the rubber binder may be hardened to almost any degree by proper compounding or other process known to rubber technology, the method of incorporation of the binder with the gel, and the subsequent treatment, being determined by the requirements of the particular process employed.

When the separator is first prepared, a large part of the minute pores may be filled with air, in which condition the separator might offer considerable resistance to the passage of the ions of the electrolyte. In order to remove the air, the separator may be subjected to a vacuum treatment while in contact with a liquid, which liquid may conveniently be the electrolyte in which it is to be used. The air may be removed after the separator has been placed in the cell of a battery by placing a vacuum on the cell. When the air is removed from the separator before the assemblage of the battery, the air-exhausted separator, filled with liquid, is preferably packed in a water-tight wrapper or container and is kept in that condition until inserted in the cell of the battery.

The high porosity of a separator constructed in accordance with my invention may be made to result either entirely from the permeability of the silica gel particles, or in part from minute voids between the particles of the silica gel not occupied by the rubber or other binding material.

To provide even more porosity, I may include with the base and binder one or more soluble or volatile compounds, such as sodium sulphate, ammonium sulphate, etc. which may be dissolved out or volatilized after the separator has solidified.

Before mixing the particles of silica gel and binding material, I may first wet the silica gel particles with water or other liquid in order to fill the pores and so prevent entrance of the binding material.

I have also discovered that I can produce a satisfactory separator by using dried permeable particles of other gel-like materials such as zeolites, silicates, or the like, in place of the silica gel, and by using instead of rubber other inert binders such as celluloid, shellac, bakelite, wax, cellulose nitrate or acetate, siliceous jellies, or analogous materials.

When zeolites or other porous complex silicates are employed in lieu of the silica gel described in the foregoing, additional porosity is obtained by reason of the minute voids resulting from the solution by the electrolytic acid of the metallic oxides of the silicates. For example, if glauconite, which in its natural state is essentially a complex hydrated silicate of potassium and iron, is treated with sulphuric acid, the potassium and iron oxides are dissolved out in the form of potassium and iron sulphates, respectively, leaving a highly porous and rigid skeleton of substantially pure silica; or if a sodium aluminum silicate material, such as that prepared by the process of my Patent No. 1,515,007, is treated with sulphuric acid, the sodium and aluminum oxides are removed, leaving an extremely porous gel-like siliceous skeleton. Processes of preparing such highly porous siliceous products from the raw materials referred to are disclosed in detail in my copending application, Serial No. 46,889, filed July 29, 1925. The treatment with acid is preferably employed outside the battery, in order to avoid the possibility of deleterious effect on the battery of the reaction products—e. g. iron sulphate, aluminum sulphate, etc.

While the present invention, for the purposes of this application, is concerned primarily with the use of the new composition of matter disclosed for the purposes of battery separators, it is obvious that other uses will be found in the chemical and allied arts for this highly permeable and inert product.

I claim:

1. A separator consisting of hard highly porous particles of a siliceous gel material held in place by an inert binder.

2. A separator consisting of particles of dried silica gel held in place by an inert binder.

3. A separator consisting of particles of dried silica gel held in place by an inert flexible binder.

4. A separator consisting of particles of dried silica gel held in place by rubber cement.

5. A separator composed primarily of hard silica gel particles held together by an inert binder.

6. A separator composed primarily of hard silica gel particles held together by an inert binder, said separator having voids in the binder between the particles.

7. A separator plate containing particles of hard silica gel.

8. A separator plate consisting of silica gel and an inert binder.

9. The process of producing a separator plate which consists in mixing particles of a hard siliceous gel material with a binder and forming the mixture into the shape of separator desired.

10. The process of producing a separator plate which consists in mixing particles of a hard siliceous gel material with a binder in solution, forming the mixture into the shape of separator desired, and drying the separator to remove the solvent.

11. The method of producing a separator plate which consists in mixing dried silica gel particles with a rubber cement, forming the mixture into the shape of separator desired, and drying the separator to remove the solvent.

12. A new composition of matter, comprising dried particles of silica gel mixed with a binder.

13. An article of manufacture, comprising dried gel particles having substantially continuous porosity, mixed with a binder.

14. A permeable composition of matter comprising dried gel particles having substantially continuous porosity, held in juxtaposition by rubber.

15. A permeable separating material, comprising rigid gel-like particles of an inert nature and having substantially continuous pores of minute size, held in juxtaposition by an inert binder.

16. An article of manufacture, comprising dried particles of a gel-like material mixed with a binder.

17. A permeable composition of matter comprising dried hard particles of a gel-like material held in juxtaposition by rubber, said particles having substantially continuous pores of minute size.

18. A permeable composition of matter, comprising dried particles having a continuous porosity similar to that of dried silica gel, mixed with a binder.

19. A permeable diaphragm for use in connection with liquids, comprising rigid particles of a gel-like material, mixed with an inert binder, said particles having a substantially continuous porosity and being inert to the liquid in connection with which said diaphragm is used.

In testimony whereof I have hereunto subscribed my name.

ABRAHAM SIDNEY BEHRMAN.